May 19, 1942. J. P. DUFFY Re. 22,098

FLANGED WALL COPING

Original Filed Sept. 16, 1940 2 Sheets-Sheet 1

May 19, 1942. J. P. DUFFY Re. 22,098

FLANGED WALL COPING

Original Filed Sept. 16, 1940 2 Sheets-Sheet 2

INVENTOR.
John P. Duffy.
BY
Thos. J. Wilson
Atty.

Reissued May 19, 1942

Re. 22,098

UNITED STATES PATENT OFFICE 22,098

FLANGED WALL COPING

John P. Duffy, Uhrichsville, Ohio, assignor to The Stillwater Clay Products Company, Cleveland, Ohio Original No. 2,233,308, dated February 25, 1941, Serial No. 357,063, September 16, 1940. Application for reissue March 30, 1942, Serial No. 436,923

12 Claims. (Cl. 72—86)

This invention relates to a flanged wall coping.

The invention aims to provide, in a manner as hereinafter set forth, a coping designed primarily as a protecting means for the top of a parapet wall, but it is to be understood that a coping, in accordance with this invention is for employment in any connection for which it may be found applicable.

The invention further aims to provide, in a manner as hereinafter set forth, a coping for the purpose referred to including a pair of internal pads for seating on and so formed for the reception of cementitious material for locking or securing them to the top of the wall.

The invention further aims to provide, in a manner as hereinafter set forth, a coping for the purpose referred to including a plurality of complemental units disposed in endwise aligned arrangement, and with the units having means for overlapping and interlocking to couple them together in the manner aforesaid.

The invention further aims to provide, in a manner as hereinafter set forth, a coping unit including a high end portion having its inner face formed throughout with a key, and a low end portion having its outer face formed throughout with a key receiving channel.

The invention further aims to provide, in a manner as hereinafter set forth, a coping unit including a body part of arcuate cross section, side flanges depending from said body part and spaced parallel depending lengthwise grooved seating pads on the inner face of said body having their seating faces aligned with the upper end of the inner faces of the flanges.

The invention further aims to provide, in a manner as hereinafter set forth, a flanged coping unit having spaced parallel depending portions on its inner face each formed lengthwise thereof with a substantially dovetailed groove in proximity to a side of the unit for the reception of cementitious material for securing the unit in overlapping relation with respect to the top of a parapet wall.

The invention further aims to provide, in a manner as hereinafter set forth, a double flanged coping formed of a plurality of complemental overlapping interengaging units forming a smooth surface on the outside of the wall with which the coping is correlated; each unit including spaced internal pads for seating it on the wall and an internal key inwardly of one end and spaced from one end of the pads, each unit having its pads formed with grooves for the reception of cement to secure the pads on the wall, and each unit being provided with a peripheral groove at its other end running the full length of the lap as well as down a flange for coaction with a key of an adjacent unit to not only anchor the units at the lap, but to also take care of any leakage that might seep through the joints between the units.

The invention further aims to provide, in a manner as hereinafter set forth, a coping which is simple in its construction, durable, strong, readily assembled in relation to a parapet wall, thoroughly efficient in its use, substantially nonleakable, and comparatively inexpensive to manufacture.

Embodying the aims aforesaid and others which may hereinafter appear, the invention consists of the novel construction, combination and arrangement of parts as will be more specifically described and illustrated in the accompanying drawings, wherein is shown the preferred embodiment of the invention, but it is to be understood that changes, variations and modifications may be resorted to which fall within the scope of the invention as claimed.

In the drawings:

Figure 3 is a view looking towards one end of a coping unit.

Figure 4 is a view similar to Figure 3 looking towards the other end of the unit.

The flanged wall coping will consist of a plurality of overlapping interengaging complemental units preferably constructed from clay, but it is to be understood that the units may be formed from any suitable material.

Figure 5:
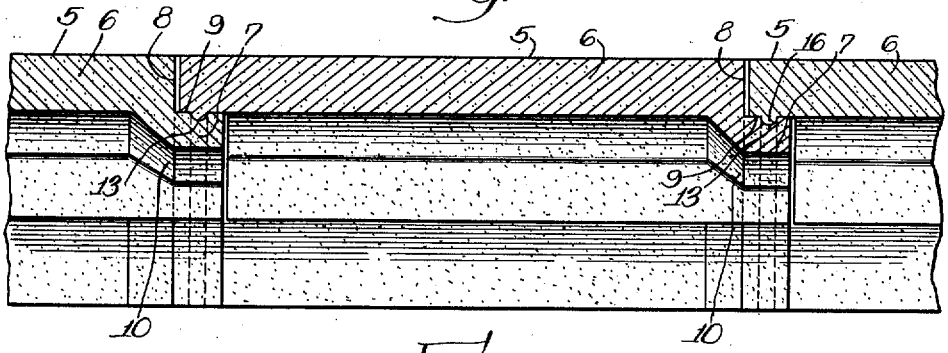
Figure 5 is a fragmentary view in longitudinal section of the coping.
Figure 6:
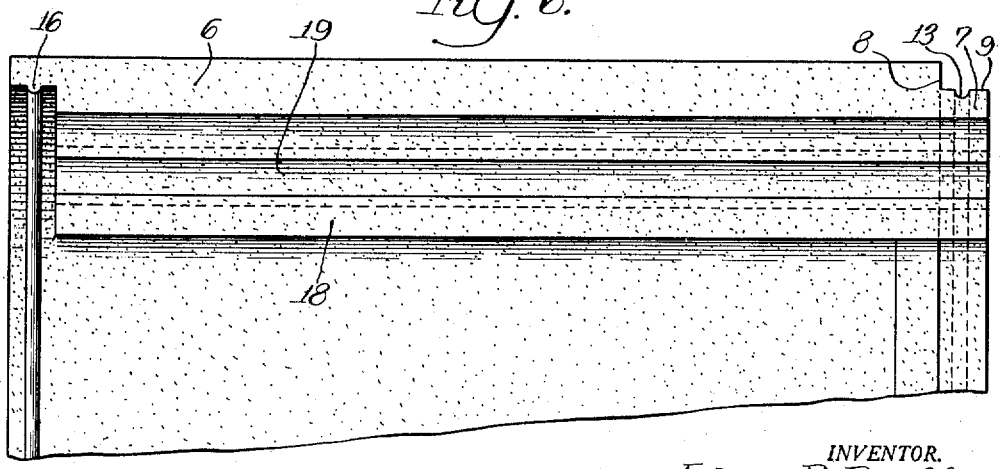
Figure 6 is a fragmentary bottom plan of a unit.

With reference to the drawings, 1 indicates a parapet wall and 2 the top of the latter. 3 indicates generally the flanged coping arranged relatively to the top and sides of wall 1. The units of the coping 3 are of like form and designated 4. Each unit 4 consists of a body part 5 of arcuate contour in transverse cross section formed of a high portion 6 and a low portion 7 of materially less height, length and width than the portion 6 (Figure 5). The top of portion 7 is arranged below the top of portion 6 to thereby provide a shoulder 8 and a seat 9. The shoulder 8 is positioned inwardly of an end of body part 5 and is disposed upwardly at right angles to the seat 9. That end of the portion 6 which provides the shoulder 8 has a depending part 10 which merges into the portion 7 whereby the said portions are connected together. Depending from the sides of the portion 6 is a pair of flanges 11. Depending from the sides of the portion 7 is a pair of flanges 12 of less width than and which merge into the flanges 11 at the point of joinder of the part 10 with portion 7. The bottom of the flanges 11, 12, are flush with each other. As the flanges 12 are inset with respect to the flanges 11, the outer sides of flanges 12 form downward continuations of the shoulder 8.

The seat 9 from end to end thereof is formed with a transverse semi-circular groove 13 and the outer side faces of the flanges 12 are provided with downward continuations 14 of the groove 13. The inner face of the portion 6 in proximity to its end 15 is formed transversely with a depending continuous semi-circular key 16, and the inner faces of the flanges 11 are formed with depending continuations 17 of the key 16.

Each unit includes a pair of spaced parallel depending pads 18, which are formed integral with the inner faces of the said portions 6, 7. The pads 18 extend from a point inwardly of the end 15 and key 16 of portion 6 to the free end of the portion 7. The pads 18 throughout are formed with dovetail grooves 19 opening centrally of the bottoms thereof. The pads are for seating on the top of wall 1, and the flanges are for disposing at opposite sides of the wall.

Figure 1:
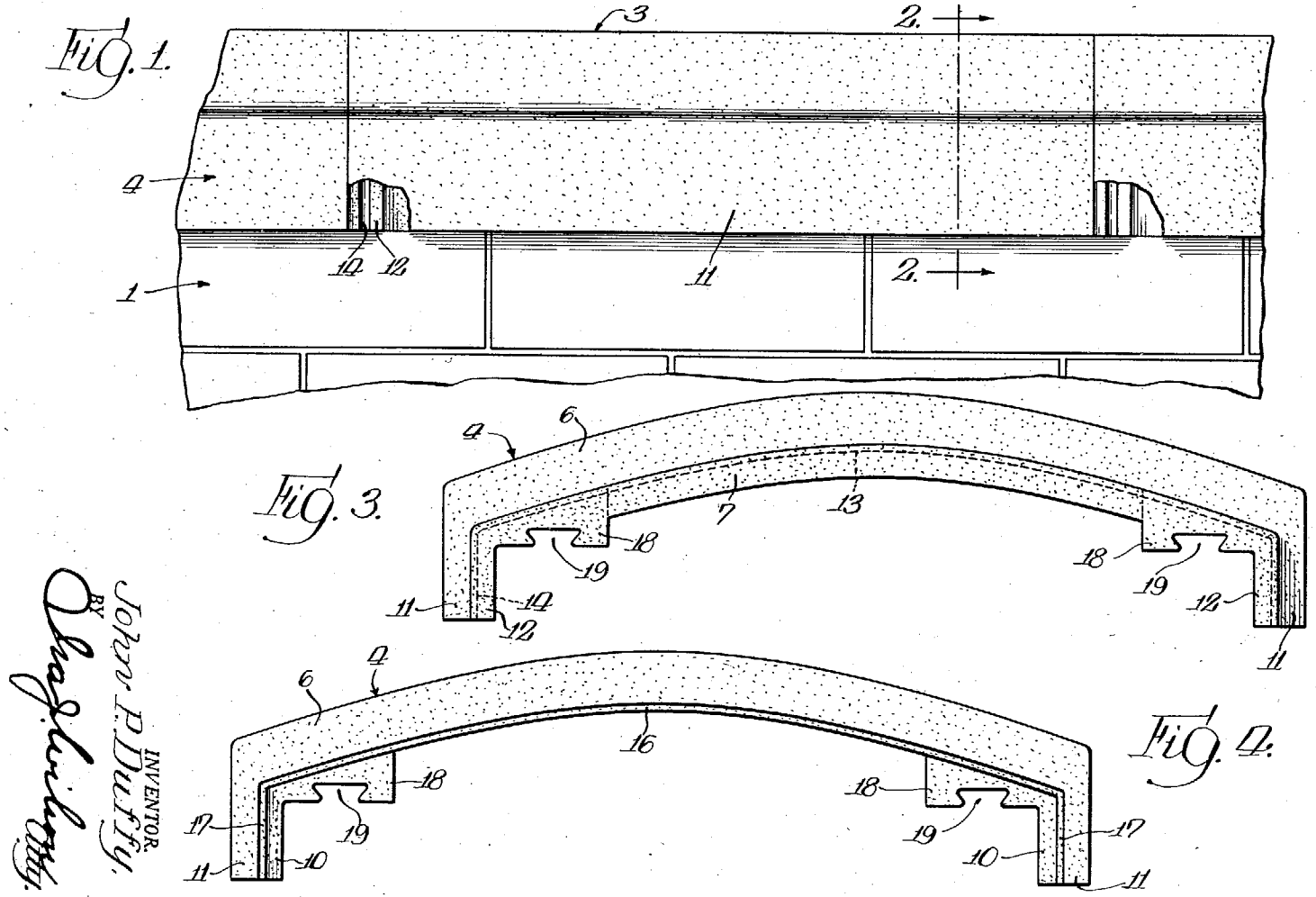
Figure 1 is a fragmentary view in side elevation of a coping in accordance with this invention, installed with respect to a parapet wall.
Figure 2:
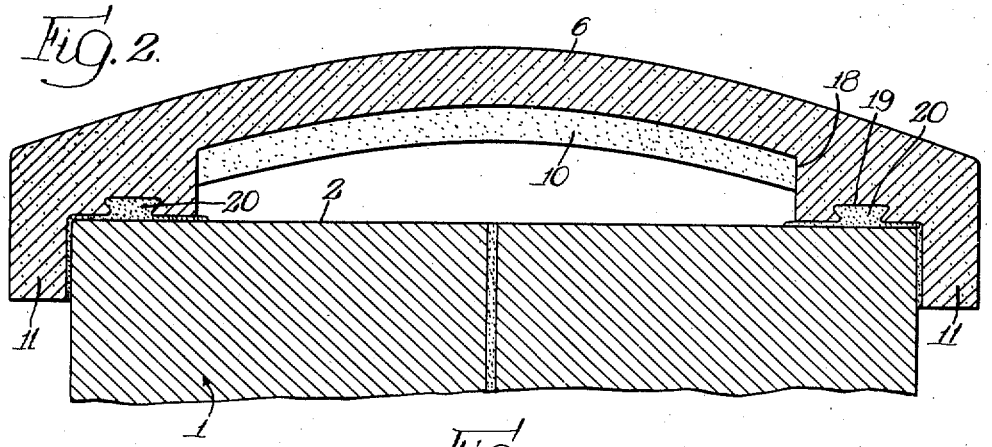
Figure 2 is a section on line 2—2 Figure 1.

When the coping is arranged relative to the wall 1, the pads 18 are secured to the latter by a body of cement 20 deposited on the top 2 of the wall 1 at each side of said top. The cement 20 extends into the grooves 19 of the pads 18, engages the lower face of the pads, is forced by compression against the upper portion of the sides of the wall 1 (Figure 2) and extends into continuations 14 of the groove 13. When a unit of the coping is arranged relative to an adjacent unit the end 15 of a portion 6 of one unit overlaps the portion 7 of an adjacent unit, and the key and its continuations seat on the groove 13 of an adjacent unit, as well as the continuations 14 of such groove, whereby the units are not only overlapped, but are interengaged and locked together, the cement assisting for such purpose. When the units are disposed in overlapping relation the end 15 of the portion 6 of one unit abuts the shoulder 8 formed by an end of the portion 6 of an adjacent unit.

Each unit includes what may be termed a one-piece body formed of a pair of inverted U-shaped parts; one of greater length, width and height than the other. Each of said parts includes what may be termed a bight and a pair of arms. The part of smallest length having its outer face inset throughout with respect to the outer face of the other of said parts, thereby forming said body with a peripheral shoulder between its transverse median and one end. The part of greatest height being formed on its inner face in proximity to one end of said body with a continuous key extending from the bottom of one side of such part to the bottom of the other side of said part. The part of smallest height has its outer face formed with a continuous groove extending from the bottom of one side of such part to the bottom of the other side of such part. Each unit further includes a pair of grooved parallel spaced pads on the inner face of its one-piece body extending from a point removed from one end of said body to the other end thereof.

What I claim is:

1. A coping unit comprising a one-piece body formed of a pair of inverted substantially U-shaped parts, each of said parts including a bight and a pair of arms, one of said parts being of greater height, length and width than the other, said part of greatest height being formed transversely of its inner face, at a point removed from one end thereof with an upstanding key of sub stantially inverted U-form, said part of smallest height having the top of its bight arranged below the top of the bight of said other part, said part of smallest height having the outer faces of its arms disposed inwardly of the outer faces of the arms of that part of greatest height and said part of smallest height having its outer face formed intermediate its ends with a groove.

2. A coping unit comprising a one-piece body formed of a pair of inverted substantially U-shaped parts, each of said parts including a bight and a pair of arms, one of said parts being of greater height, length and width than the other, said part of greatest height being formed transversely of its inner face, at a point removed from one end thereof with an upstanding key of substantially inverted U-form, said part of smallest height having the top of its bight arranged below the top of the bight of said other part, said part of smallest height having the outer faces of its arms disposed inwardly of the outer faces of the arms of that part of greatest height and said part of smallest height having its outer face formed intermediate its ends with a groove, said key and groove corresponding in length.

3. A coping unit comprising a one-piece body formed of a pair of inverted substantially U-shaped parts, each of said parts including a bight and a pair of arms, one of said parts being of greater height, length and width than the other, said part of greatest height being formed transversely of its inner face, at a point removed from one end thereof with an upstanding key of substantially inverted U-form, said part of smallest height having the top of its bight arranged below the top of the bight of said other part, said part of smallest height having the outer faces of its arms disposed inwardly of the outer faces of the arms of that part of greatest height, said part of smallest height having its outer face formed intermediate its ends with a groove, and said body being formed on its inner face with a pair of depending spaced parallel grooved pads extending from a point removed from one end of said body to the other end of the latter, corresponding ends of said pads being spaced inwardly from said key.

4. A coping unit comprising a one-piece body formed of a pair of inverted substantially U-shaped parts, each of said parts including a bight and a pair of arms, one of said parts being of greater height, length and width than the other, said part of greatest height being formed transversely of its inner face, at a point removed from one end thereof with an upstanding key of substantially inverted U-form, said part of smallest height having the top of its bight arranged below the top of the bight of said other part, said part of smallest height having the outer faces of its arms disposed inwardly of the outer faces of the arms of that part of greatest height said part of smallest height having its outer face formed intermediate its ends with a groove, said key and groove corresponding in length, and said body being formed on its inner face with a pair of spaced depending, parallel grooved pads extending from a point removed from one end of said body to the other end of the latter, corresponding ends of said pads being spaced inwardly from said key.

5. A coping unit comprising a one-piece body formed of a pair of inverted substantially U-shaped parts, each of said parts including a bight and a pair of arms, one of said parts being of greater height, length and width than the other, said part of greatest height being formed transversely of its inner face, at a point removed from one end thereof with an upstanding key of substantially inverted U-form, said part of smallest height having the top of its bight arranged below the top of the bight of said other part, said part of smallest height having the outer faces of its arms disposed inwardly of the outer faces of the arms of that part of greatest height said part of smallest height having its outer face formed intermediate its ends with a groove, and said body being formed on its inner face with a pair of spaced depending, parallel grooved pads extending from a point removed from one end of said body to the other end of the latter, corresponding ends of said pads being spaced inwardly from said key, the groove in each of said pads being substantially of dovetail form, opening at the bottom of and coextensive with the length of the pad.

6. A coping unit comprising a one-piece body formed of a pair of inverted substantially U-shaped parts, each of said parts including a bight and a pair of arms, one of said parts being of greater height, length and width than the other, said part of greatest height being formed transversely of its inner face, at a point removed from one end thereof with an upstanding key of substantially inverted U-form, said part of smallest height having the top of its bight arranged below the top of the bight of said other part, said part of smallest height having the outer faces of its arms disposed inwardly of the outer faces of the arms of that part of greatest height said part of smallest height having its outer face formed intermediate its ends with a groove, said key and groove corresponding in length, and said body being formed on its inner face with a pair of spaced depending parallel grooved pads extending from a point removed from one end of said body to the other end of the latter, corresponding ends of said pads being spaced inwardly of said key, the groove in each of said pads being substantially of dovetail form, opening at the bottom of and coextensive with the length of the pad.

7. A coping comprising a plurality of endwise aligned complemental units each comprising a one-piece body formed of a high part and a low part, said parts being of a contour for overlapping the sides and being formed with internal depending grooved spaced portions for seating on the top of a wall, the inner face of said low part being inset throughout with respect to the inner face of said high part, the outer face of said low part being flush throughout with respect to the inner face of said high part, said low part having its outer face formed with a groove, said high part having its inner face provided with a key inwardly adjacent one end thereof, the high part of one unit for overlapping the lower part of an adjacent unit, the key on the high part of one unit for interengaging with the groove in the low part of an adjacent unit whereby the units will be connected together, said spaced portions having corresponding ends flush with the free end of said low part and their corresponding ends disposed inwardly of and in proximity to said key.

8. A coping comprising a plurality of endwise aligned complemental units each comprising a one-piece body formed of a high part and a low part, said parts being of a contour for overlapping the sides and having spaced portions for seating on the top of a wall, the inner face of said low part being inset throughout with respect to the inner face of said high part, the outer face of said low part being flush throughout with respect to the inner face of said high part, said low part having its outer face formed with a groove, said high part having its inner face provided with a key inwardly adjacent one end thereof, the high part of one unit for overlapping the low part of an adjacent unit, the key on the high part of one unit for interengaging with the groove in the low part of an adjacent unit whereby the units will be connected together, said spaced portions having corresponding ends flush with the free end of said low part and their corresponding ends disposed inwardly of and in proximity to said key, the said spaced portions being disposed in parallel spaced relation and each provided lengthwise thereof with a downwardly opening groove for receiving a body of cement to secure said portions to the top of the wall.

9. A coping unit comprising a one-piece body formed of a pair of inverted substantially U-shaped parts each including a bight and a pair of arms, one of said parts being of greater height, length, and width than the other, said part of greatest height being formed transversely throughout its inner face and at a point removed from one end thereof with an upstanding key of substantially inverted U-form, said part of smallest height having the top of its bight arranged below the top of the bight of the other part, said part of smallest height having the outer faces of its arms disposed inwardly of the outer faces of the part of greatest height, the lower ends of the arms of said parts being flush, said part of smallest height having its outer face flush with the inner face of the part of greatest height, said part of smallest height having its outer face formed intermediate its ends throughout with a groove, and a pair of spaced parallel depending pads, each pad being integral with a side portion of the inner face of the bight of the part of greatest height, said pads having flat lower faces flush with the points of mergence of the arms of the part of greatest height with the bight of the latter, and the said flat lower surfaces of said pads being grooved lengthwise thereof throughout.

10. A coping unit comprising a one-piece body formed of a pair of inverted substantially U-shaped parts, each of said parts including a bight and a pair of arms, one of said parts being of greater height, length and width than the other, said part of smallest height having the top of its bight arranged below the top of the bight of said other part, and having the outer faces of its arms disposed inwardly of the outer faces of the arms of that part of greatest height, said part of smallest height having its outer face formed intermediate its ends with a groove, and said body being formed on its inner face with a pair of depending spaced parallel grooved pads extending from a point removed from one end of said body to the other end of the latter.

11. A coping unit having an integrally formed body, consisting of two substantially U-shaped parts each providing a top and flanges depending from the longitudinal edges thereof, the top and flanges of one of said parts being dimensioned to telescope within the top and flanges of the other part of an identical unit, said body including a pair of supporting pads extending longitudinally thereof along the junctures of the top of one of said parts with the flanges depending therefrom, each of said pads presenting a substantially flat supporting surface extending inwardly from a flange and being provided with a dove-tail groove, said pads terminating short of the telescoping portion of the larger of said body parts.

12. An integrally formed coping unit, comprising a portion consisting of a top, flanges depending from the longitudinal edges thereof, and pads presenting supporting surfaces extending inwardly from said flanges and provided with dovetail grooves, and a second portion projecting longitudinally from one end of said first portion and consisting of a top and flanges depending from the longitudinal edges thereof proportioned to project within the confines of the top and flanges of the first portion of a companion unit, the ends of said supporting pads remote from said second portion being spaced inwardly from the corresponding end of said first portion.

JOHN P. DUFFY.